United States Patent [19]

Frankard et al.

[11] Patent Number: 4,680,126
[45] Date of Patent: Jul. 14, 1987

[54] SEPARATION AND RECOVERY OF REUSABLE HEAVY METAL HYDROXIDES FROM METAL FINISHING WASTEWATERS

[76] Inventors: James M. Frankard, 175 E. Lake Blvd.; Orville V. Broch, 101 E. Mark St., both of Winona, Minn. 55987

[21] Appl. No.: 830,532

[22] Filed: Feb. 18, 1986

[51] Int. Cl.$^4$ ............................................... C02F 1/62
[52] U.S. Cl. .................................... 210/710; 210/712; 210/722; 210/724; 210/726; 210/912; 210/913; 204/DIG. 13
[58] Field of Search ............... 210/702, 710, 711, 712, 210/721, 722, 724, 726, 737, 912, 913; 423/104; 204/DIG. 13

[56] References Cited

U.S. PATENT DOCUMENTS

| | | | |
|---|---|---|---|
| 3,725,266 | 4/1973 | Haviland et al. | 210/710 |
| 3,784,669 | 1/1974 | Elges | 210/720 |
| 3,800,024 | 3/1974 | Forsell et al. | 210/710 |
| 3,931,007 | 1/1976 | Shugano et al. | 210/717 |
| 4,018,680 | 4/1977 | Kupfer | 210/710 |
| 4,025,430 | 5/1977 | Pagel | 210/710 |
| 4,163,716 | 8/1979 | Turnbull | 210/722 |
| 4,171,255 | 10/1979 | Tuznik et al. | 204/238 |
| 4,282,190 | 8/1981 | Müller et al. | 423/104 |
| 4,338,200 | 7/1982 | Zeijlstra | 210/724 |
| 4,343,706 | 8/1982 | Erzel et al. | 210/912 |

FOREIGN PATENT DOCUMENTS 989813 4/1965 United Kingdom .

OTHER PUBLICATIONS

Kreye, William C. et al, *Treatment of Zinc Plating and Oil Bearing Washer Wastewater*, Proceedings of the 33rd Industrial Waste Conference, Purdue University, 1978, Ann Arbor Science Publishers Inc., 1979, pp. 155-159.

*Primary Examiner*—David Sadowski
*Assistant Examiner*—Jeffrey W. Peterson
*Attorney, Agent, or Firm*—Merchant, Gould, Smith, Edell, Welter & Schmidt

[57] ABSTRACT

A method is disclosed for the elimination of hazardous metal wastewater and sludges by recovering the non-ferrous metals zinc, nickel, copper (II), cadmium or chromium (III) present in an aqueous sludge comprising mixed metal hydroxides by selectively precipitating the ferrous metal ions present while maintaining the non-ferrous metal ions in solution, isolating the precipitate and then precipitating the non-ferrous metal ions from solution.

29 Claims, No Drawings

SEPARATION AND RECOVERY OF REUSABLE HEAVY METAL HYDROXIDES FROM METAL FINISHING WASTEWATERS

FIELD OF THE INVENTION

The present invention provides a process for eliminating hazardous plating wastewaters and waste metal sludges by the recovery of toxic non-ferrous metals therefrom by the use of selective precipitation.

BACKGROUND OF THE INVENTION

Ferrous metal products are commonly rendered corrosion resistant by the application of electroplated coatings of non-ferrous metals such as zinc, nickel, copper, cadmium and chromium. Electroplate is also employed to provide a decorative finish on many types of metal products. Zinc is the metal which is predominantly employed for electroplating.

Presently, more than 40% of the plating shops in the United States electroplate zinc from a variety of plating baths. These include highly alkaline plating solutions, which often contain cyanide as a complexing agent, and acidic baths containing chloride or sulfate salts and buffers for pH control. Other less commonly-used acidic baths use fluoroborate and pyrophosphate salts. Proprietary organic additives are often used to produce a bright finish.

Each year, zinc plating operations in the United States generate five billion gallons of wastewater contaminated with zinc, which must be removed prior to release of the wastewater into the environment. The majority of zinc platers currently employ conventional wastewater treatment techniques for the removal of zinc. Typically, the pH of the wastewater is adjusted to about 8–11 to precipitate the metallic cations as the corresponding hydroxides, which are gravity concentrated and dewatered to yield a toxic heavy metal sludge.

Even when highly concentrated, this sludge is not reusable in plating baths, since it contains substantial amounts of iron and water hardness factors (calcium and magnesium salts). Therefore, the sludge must be containerized and shipped to environmentally-secure landfill sites. The total cost of such "safe" permanent disposal is very high, and can equal or exceed the value of the chemicals used in the plating process. The number of these hazardous waste disposal sites is declining. Many of the sites will require costly remedial action under state and federal laws which hold the waste generator to be ultimately responsible for clean-up costs. The proposed USEPA Disposal Elimination Schedule will force platers to employ metal recovery methods by banning land disposal of such hazardous electroplating wastes by 1988. See Federal Register (May 13, 1985).

In order to avoid the formation of these intractable chemically-complex metal waste sludges, processes have been developed based on the selective precipitation of metal values from aqueous solutions of dissolved metals. For example, U.S. Pat. No. 3,800,024 discloses a process for the sequential removal of iron, chromium and nickel from spent acidic steel pickling solutions by raising the pH of the solution in two steps. R. F. Pagel, (U.S. Pat. No. 4,025,430), discloses the sequential treatment of an acidic effluent with a controlled amount of lime, followed by precipitation of the metal ions remaining in the overflow with sodium silicate. However, such processes do not address the problems associated with recovering the metal values from alkaline plating waste-waters and waste metal sludges containing mixtures of precipitated metal hydroxides. Furthermore, the presently-available technologies such as ion exchange, reverse osmosis, evaporation and electrolysis cannot economically separate and recover the metal values from these complex wastewaters and sludges.

Therefore, a need exists for a method to remove the metal values from metal-containing wastewaters and sludges to afford effluents which can be safely discharged into the environment. A further need exists for a method to separate non-ferrous metals from the ferrous metal and water hardness factor impurities present in these aqueous metal wastes to yield a reusuable non-ferrous metal-containing product.

SUMMARY OF THE INVENTION

The present invention is directed to a method for the recovery of metal values from wastewaters and waste metal sludges which comprise aqueous slurries or dispersions of ferrous metal and non-ferrous metal hydroxides. Such wastewaters and sludges are the product of the conventional treatment of metal-contaminated effluent water, including wastewaters from electroplating, electropolishing, mechanical metal plating, anodizing, acid pickling and cleaning, and the like. Typically, the wastewaters from a given process are combined and treated with alkali metal or alkaline earth metal hydroxides or oxides to yield colloidal metal hydroxide dispersions, or sludges.

According to the present invention, an aqueous slurry comprising solid ferrous hydroxide [$Fe(OH)_2$] and a solid non-ferrous metal hydroxide such as zinc, nickel, copper (II), cadmium or chromium (III) hydroxide is treated to oxidize the $Fe(OH)_2$ to ferric hydroxide [$Fe(OH)_3$] and pH-adjusted to precipitate the $Fe(OH)_3$ while retaining the non-ferrous metal in solution. The solid $Fe(OH)_3$ is then removed from the slurry and the pH of the liquid phase is adjusted to reprecipitate the non-ferrous metal hydroxide. This solid product is then isolated from an aqueous effluent which has been cleared of metal values to the extent that it can be safely discharged into the environment. Typically, the recovered non-hazardous ferric hydroxide is also disposed of while the non-ferrous metal hydroxide is of sufficient purity to be re-used in the primary metal-treating process without further treatment.

In a preferred embodiment of the invention, essentially pure zinc hydroxide is recovered from mixed metal hydroxide sludges. These sludges can be obtained from waste-waters containing dissolved zinc and iron, such as those generated by alkaline and acidic zinc plating streams, including preplate and postplate operations. The pH of the process wastewater is adjusted to about 8–11 to yield an aqueous slurry comprising solid zinc hydroxide and iron hydroxides. Preferably, this treatment slurry is then concentrated by gravity settling or filtration methods to reduce the volume of the liquid slurry. The pH of the slurry is then lowered to dissolve the zinc hydroxide while the slurry is aerated to oxidize ferrous hydroxide to insoluble ferric hydroxide. The insoluble ferric hydroxide is then removed from the slurry, e.g. by filtration, and the pH of the resultant filtrate is raised to reprecipitate the zinc hydroxide. The recovered solid zinc product can be returned to the plating bath without further treatment. Alternatively, the zinc solids can be thermally converted into zinc oxide, e.g. by heating the hydroxide cake at 300°-500° C. This embodiment of the present process permits the recovery of greater than 90%, preferably about 93-98% of the total zinc present in the starting slurry (the wastewater or sludge) over a wide range of operating temperatures (about 10°-90° C.), employing inexpensive, readily available reagents.

If desired, the steps of the present process can be readily automated, so that the combined plating process wastewater streams are converted into a mixed metal hydroxide sludge, concentrated and further processed to recover the plating metal values in a continuous fashion. Such an automated system can be established and operated with relatively inexpensive, commercially-available equipment.

The amphoteric precipitation properties of zinc salts can also be used to separate zinc from additional non-ferrous metals in the course of the separation of the non-ferrous metal hydroxides from iron hydroxide. For example, a zinc-nickel-iron hydroxide mixture is separable by lowering the pH to dissolve the zinc and nickel hydroxides while aerating to precipitate ferric hydroxide. The pH is then raised to above 12, e.g. to about 12.0-13.5 to precipate nickel hydroxide while retaining the zinc in solution as the zincate ion. After removal of the nickel hydroxide, the pH is lowered to about 7-11 to reprecipitate the zinc hydroxide.

Although for convenience, the precipitated metal solids are referred to herein as "hydroxides", it is believed that they may contain substantial amounts of other compounds such as hydrated oxides, and carbonates.

DETAILED DESCRIPTION OF THE INVENTION

The aqueous slurries of mixed metal hydroxides which provide the starting materials for the present invention can be formed from dilute aqueous solutions of metal ions such as the acidic or alkaline wastewaters which are derived from a wide variety of metal processing operations. For example, a typical zinc electroplating process employing an alkaline zinc cyanide bath at pH 12-13.5 also includes the following operations; preplate cleaning, preplate pickling, preplate stripping and postplate chromating wastewater. Wastewaters from acidic zinc plating baths (pH 1-6.5) can also be processed by the present method. Furthermore, zinc mechanical plating (peen-plating) also yields wastewater containing dissolved zinc.

If necessary, the wastewaters are pretreated to destroy metal-ion complexing agents and to reduce hexavalent chromium. The pH of the wastewater is then adjusted to about 8-11 with an alkali metal hydroxide or alkaline earth metal hydroxide to precipitate the metal ions as the corresponding hydroxides. See, for example, U.S. Pat. No. 4,338,200. Preferably, the resultant slurry is concentrated prior to further processing, e.g. from about 0.05-1% solids to about 1-7% solids, for instance, by gravity settling in a flow-through tank or a still holding tank. Alternatively, more concentrated sludges which are in the form of semi-solid cakes or pastes can be diluted with water to flowable slurries prior to further processing according to the present invention.

The aqueous slurry comprising a mixture of metal hydroxides is then treated to complete the oxidation of the ferrous hydroxide present to ferric hydroxide and to selectively solubilize the non-ferrous metal hydroxide present, e.g., zinc hydroxide. Preferably, these operations are carried out in the same treatment zone, which may be referred to as the "metal dissolving zone." More preferably, the oxidation and pH lowering steps of the present process are carried out simultaneously, although in some instances it is desirable to accomplish the oxidation step prior to pH adjustment.

For example, an aqueous sludge comprising about 1-7% hydroxide solids can be gravity-flowed into a metal dissolving zone such as a treatment tank where the liquid is agitated, aerated and treated by the addition of an acid to lower the pH to the desired range, e.g. to about 3-7. Agitation and aeration may be accomplished by any convenient means, e.g. by propeller stirring or by low pressure air bubbling, respectively. Acid additions can be controlled by a pH receiver which is operated to maintain a given pH at a monitoring electrode.

Preferably, the pH will be lowered into the desired range by means of the addition of the appropriate amount of an aqueous mineral acid such as sulfuric acid, hydrochloric acid, and the like, while aeration is continued until substantially all of the ferrous oxide present has been converted into ferric oxide. The end-point pH is selected to fall within a range wherein (a) the desired non-ferrous metal hydroxide is soluble and (b) ferric hydroxide is not significantly soluble. These metal dissolving ranges are summarized in Table I, below, for a number of non-ferrous metals.

TABLE I

| Metal | Dissolving Range (pH) | |
|---|---|---|
| | Useful | Preferred |
| $Zn^{+2}$ | 3-7 | 3.2-6.6* |
| $Ni^{+2}$ | 3-7 | 3.2-6.7 |
| $Cu^{+2}$ | 3-7 | 3.2-6.4 |
| $Cd^{+2}$ | 3-7 | 3.2-6.5 |
| $Cr^{+3}$ | 3-5 | 3.2-4.9 |

*Optimal: 4.0-5.5

Following pH stabilization and a sufficient period of aeration and agitation, the solids-laden "dissolved metal" slurry is treated to remove the precipitated ferric hydroxide and any hardness factors precipitated by the addition of sulfuric acid, e.g. $CaSO_4$. The removal can be accomplished by filtration systems such as plate filter presses, gravity belt filters, vacuum belt and drum filters, centrifugal filters and the like. The isolated solids can also be washed with aqueous acid (pH 4-6) to remove any entrained zinc-containing solution. This filtrate can then be returned to the metal dissolving zone for further treatment. In operations such as those involving the treatment of dilute hydroxide slurries, it may be desirable to allow the ferric hydroxide precipitate to concentrate in a settling zone prior to feeding the dissolved metal slurry into the filter.

The pH of the filtrate containing the target dissolved non-ferrous metal ions such as dissolved zinc ions, is then raised to within the range required to reprecipitate the non-ferrous metal, as by the addition of a base such as solid or liquid alkali metal hydroxide, with agitation as required. Preferred alkali hydroxides include sodium or potassium hydroxide. These reprecipitation ranges are summarized in Table II, below, for several non-ferrous metals.

TABLE II

| Metal | Reprecipitation Range (pH) | |
|---|---|---|
| | Useful | Preferred |
| $Zn^{+2}$ | 7-11 | 8.3-10.4* |
| $Ni^{+2}$ | 8-14 | 8.1-13.5 |

TABLE II-continued

| | Reprecipitation Range (pH) | |
|---|---|---|
| Metal | Useful | Preferred |
| $Cu^{+2}$ | 8-14 | 8.25-13.5 |
| $Cd^{+2}$ | 7-14 | 7.5-13.5 |
| $Cr^{+3}$ | 5.75-14 | 6.0-13.0 |

*8.5-9.5 optimal to avoid $Ca^{+2}/Mg^{+2}$ precipitation.

When it is desired to separate zinc from nickel copper, cadmium or chromium, the latter metals can first be reprecipitated at the upper end of the given range (pH=12.0−13.5+). At this pH, zinc will remain in solution and following filtration, can be reprecipitated free of contaminants comprising both ferrous and non-ferrous metals by lowering the pH of the filtrate to about 8-11.

Following an optional settling step, the reprecipitated metal hydroxide can be isolated, e.g. be filtration, and can be reintroduced directly into the parent metal plating or similar process or further treated. For example, the zinc hydroxide and associated hydrated oxides and carbonates can be converted to zinc oxide thermally, i.e., by heating at 300°-500° C.

On the other hand, the dissolved metal concentration of the filtrate has been lowered ro the extent that it can be disposed of without further treatment. In accordance with the present invention, greater than 90% of the zinc in the slurry-starting material can be recovered in the reprecipitated cake, while less than 1 mg/liter remains in the final effluent phase.

The invention will be further described by reference to the following detailed examples.

EXAMPLE I—ZINC RECOVERY

Four one-gallon (3.8 liter) samples of an alkaline, metal hydroxide slurry were taken from the sludge holding tank of a commercial zinc electroplating operation which employs conventional pH adjustment and gravity settling to remove zinc from its total wastewater flow. The pH of each of the four samples was determined, and the samples were analyzed for total zinc, iron and for total calcium and magnesium concentration. The results of this analysis are summarized on Table III below. All procedures were performed at 21°-25° C., unless otherwise noted.

TABLE III

| | Waste Slurry Starting Material | | |
|---|---|---|---|
| | Analysis | | Calcium and |
| Sample No. | pH | Zinc G/L* | Iron G/L | Magnesium Mole/L (EDTA) |
| 1 | 9.3 | 4.34 | 1.16 | .0250 |
| 2 | 8.6 | 2.16 | 2.82 | .0144 |
| 3 | 10.2 | 3.59 | 1.43 | .0197 |
| 4 | 9.9 | 3.75 | 0.95 | .0234 |

*grams per liter

Three 1000 ml aliquots of each of the four slurry samples were then employed to make up a set of twelve test samples for treatment according to the present invention as described hereinbelow.

An aqueous solution of 1.0 g of ferrous sulfate (Fe-$SO_4.7H_2O$) in 10.0 ml water was added to each sample to raise the iron (II) level present. Aqueous 20% sulfuric acid ($H_2SO_4$) was added with stirring in an amount effective to lower the pH of each sample to 4–6, to dissolve the zinc solids present. Each sample was then aerated for 60 min. at 1500 cc/min. to oxidize the iron (II) present to iron (III). The resultant solution was vacuum-filtered and the residue of hydrated iron oxide ("Fe(OH)$_3$") was washed with 300 ml of deionized water and collected. The wash was combined with the filtrate.

The pH of each filtrate was adjusted to 7-11 with sodium hydroxide to precipitate the dissolved zinc and the resultant white solids were recovered by filtration in vacuo. The precipitate was washed with 300 ml of water and dried at 110° C. for 2 hours. The solid precipitate was then analyzed for zinc, iron and total water hardness factor ions ($Ca^{+2}/Mg^{+2}$). The filtrate was analyzed for total zinc. The data obtained from these twelve runs is summarized on Table IV, below.

TABLE IV

| | | | RECOVERED ZINC SOLIDS ANALYSIS | | | | | Original | |
| Sample No. (Aliquot No.) | pH Used to Dissolve Zinc Solids | Reprecipitation pH | Tot. Wt. (grams) | Zinc (grams) | Iron (grams) | Calcium & Magnesium (Moles) (EDTA) | Zinc wt. % | Zinc Recovered % | Zinc In Final Filtrate (mg/l) |
|---|---|---|---|---|---|---|---|---|---|
| 1(A) | 4.3 | 7.4 | 8.05 | 4.21 | .02 | .0040 | 52 | 97 | 19.0 |
| 2(A) | 4.2 | 8.1 | 4.43 | 2.08 | .01 | .0034 | 47 | 96 | 3.1 |
| 3(A) | 4.4 | 9.3 | 8.23 | 3.49 | .02 | .0106 | 42 | 97 | <1.0 |
| 4(A) | 4.2 | 10.8 | 12.67 | 3.62 | .03 | .0150 | 29 | 97 | <1.0 |
| 1(B) | 5.0 | 7.2 | 9.38 | 4.26 | <.01 | .0048 | 45 | 98 | 27.0 |
| 2(B) | 5.2 | 8.2 | 4.40 | 2.11 | <.01 | .0066 | 47 | 98 | 3.5 |
| 3(B) | 5.2 | 9.8 | 8.61 | 3.44 | <.01 | .0114 | 40 | 96 | <1.0 |
| 4(B) | 5.3 | 11.0 | 10.71 | 3.58 | <.01 | .0182 | 33 | 95 | <1.0 |
| 1(C) | 5.5 | 7.4 | 8.95 | 4.10 | <.01 | .0056 | 46 | 94 | 12.6 |
| 2(C) | 5.6 | 8.4 | 4.58 | 2.02 | <.01 | .0054 | 44 | 94 | 1.4 |
| 3(C) | 5.9 | 9.3 | 7.86 | 3.35 | <.01 | .0073 | 43 | 93 | <1.0 |
| 4(C) | 5.5 | 10.7 | 10.64 | 3.62 | <.01 | .0169 | 34 | 97 | 1.2 |

The data summarized on Table IV indicate that in the case of samples 1A, 2A, 3A and 4A, a detectable amount of iron was found in the reprecipitated zinc solids. This is probably due to the difficulty in oxidizing ferrous to ferric ions by aeration at pH values below about 5. Thus, any ferrous ion present after aeration will be coprecipitated with the zinc in the alkalinization step. It is expected that longer aeration times or avoidance of the low end of the "zinc dissolution" pH range will prevent the pass-through of ferrous ions.

In Sample Nos. 4A, 3B, 4B and 4C, the weight percent of zinc in the recovered solid product is significantly lower than in the other samples. This coincided with significantly higher levels of hard water mineral metals found together with zinc in the recovered solid product, and indicates that the pH value used to reprecipitate the zinc should preferably be kept below a pH of about 10 to avoid the undesirable removal of hard water metal ions ($Ca^{+2}/Mg^{+2}$) with the zinc solids. Hard water metal ions are probably removed as the insoluble carbonates and hydroxides of calcium and magnesium.

The percentage of the original zinc recovered for all samples was 93–98%. The majority of the unrecovered zinc was found by further analysis to be retained in the iron solids removed by the first filtration. It is expected that higher zinc recovery efficiencies can be attained by washing the waste iron solids with weakly acidified water (pH 4–6) and recycling the wash water in the acidification step.

The data summarized on Table IV demonstrate that the zinc values can be efficiently recovered from wastewater comprising a slurry of mixed metal hydroxides without significant contamination by iron or water hardness factor ions. Furthermore, the zinc levels in the final aqueous phase can be reduced to a level which would permit discharge of the wastewater into the environment without further treatment.

EXAMPLE II—RECOVERY OF NICKEL, COOPER, CADMIUM AND CHROMIUM

Solutions containing nickel, copper, chromium and cadmium were obtained by sampling electroplating baths containing these metals. The nickel, copper and chromium bath samples were all acid-type electroplating solutions. The nickel and copper samples also contained proprietary organic brightening agents. The cadmium bath was a conventional alkaline cadmium cyanide-based plating solution containing organic brightening agents.

Each bath sample was analyzed for plating metal concentration. A measured volume of each bath sample was then diluted with tap water to yield a 2000 ml test solution containing 10.0 g of the plating metal. This metal concentration corresponds to the concentration of metals typically found in settled hydroxide wastewater slurries (2–7 g/l).

The cadmium test solution was treated portionwise with 10% w/v sodium hypochlorite to oxidize all the cyanide ions present. The reaction end-point was determined by a positive potassium iodide starch paper test for chlorine. The chromium test solution was treated with excess 10% w/v sodium metabisulfite to reduce all the hexavalent chromium to trivalent chromium ($Cr^{+3}$).

A solution of aqueous ferrous sulfate (25 ml) containing 8% w/w iron was added to each of the test solutions to ensure the presence of iron (II) in the samples.

The pH of each test solution was adjusted to 8–11 to completely precipitate the target non-ferrous metal. Within this range, all of the ferric or ferrous ions precipitate along with the target metal. The pH of all of the acidic samples was adjusted with 10% w/v aqueous sodium hydroxide. The pH of the basic cadmium test solution was lowered with 10% v/v aqueous sulfuric acid. At this point, the composition of each sample corresponded to a typical plating wastewater treatment slurry containing both non-hazardous iron solids and the hazardous "metal of value" solids in the form of insoluble hydroxides.

The pH of each test sample was then adjusted with 10% v/v aqueous sulfuric acid to 3.5–5.5 to redissolve the metal of value. Vigorous aeration and mechanical agitation was used throughout the period of pH adjustment and continued for an additional 90 minutes to complete the oxidation and precipitation of the ferrous ions which would otherwise remain in solution along with the target metal. The acidified and aerated test samples were vacuum-filtered using a Buchner funnel to remove all of the iron solids as ferric hydroxide. The isolated iron waste solids were washed with 500 ml deionized water (pH 3.5–5.0), and the wash water was combined with the filtrate.

The pH of each filtrate was raised to 8–11 by the addition 10% w/v aqueous sodium hydroxide to reprecipitate the dissolved plating metal. The precipitate was isolated by vacuum filtration using a Buchner funnel and the solids were analysed for total plating metal and for iron. The results of these analyses are summarized in Table V, below.

TABLE V

| Component | Plating Metal Sample | | | |
|---|---|---|---|---|
| | Nickel | Copper | Cadmium | Chromium |
| Starting metal | 10.0 g | 10.0 g | 10.0 g | 10.0 g |
| Recovered metal | 9.8 g | 9.6 g | 9.8 g | 9.5 g |
| Iron in recovered solids | <0.1 g | <0.1 g | <0.1 g | <0.1 g |

The results summarized in Table V demonstrate that the present metal recovery process is effective to recover the non-ferrous metals nickel, copper, cadmium, and chromium from alkaline slurries containing the corresponding hydroxides. It was observed that the cadmium and nickel solids dissolved much more slowly than the zinc solids. Also, the nickel solids reprecipitated more slowly and over a wider pH range than did the zinc solids. However, these reaction differences would not prevent the economic application of the present recovery process to these plating metals.

Continuous Zinc Recovery Method

The wastewater stream generated by combining the preplate cleaning, preplate stripping, plating bath and postplate chromating wastewaters from an alkaline zinc cyanide plating process was flowed into a conventional wastewater pretreatment tank system. Following destruction of cyanide, reduction of Cr(VI) and pH adjustment to 9.0, the total combined wastewater stream was transferred into a flow through gravity settling tank. The collected settled hydroxide solids were then transferred to a storage tank that holds and further concentrates the solids. The inflow to the storage tank contained 0.2–0.8% solids, while the concentrated slurry which collected in the storage tank bottom contained 1–7% solids. The storage tank overflow return stream contained less than 0.05% solids, and was gravity returned to the flow through settling tank.

The stored slurry was gravity-flowed from the bottom of the storage tank to a zinc dissolve tank. Acid was added to dissolve the zinc-containing solids, and the solution was aerated to complete the oxidation of Fe(II) to Fe(III). Acid additions were controlled by a pH receiver to maintain a pH of 5–6 at a monitor electrode. Mechanical mixing was provided by a prop mixer and aeration was provided by low pressure air through a bubbler pipe.

The solids-laden dispersion was then pumped into a chamber plate type filter press to separate the iron solids from the zinc-containing solution. The solids were automatically water-rinsed at the end of the filtration cycle and the rinse water was returned to the zinc dissolve tank. The non-toxic iron solids were manually backwashed into a sanitary sewer when the filter plates were emptied. The clear filtrate was introduced into a zinc floc tank where the pH was continuously adjusted to 8-9 to precipitate the zinc as zinc hydroxide. The zinc hydroxide slurry was pumped through a filter press to produce a concentrated, reusable zinc hydroxide filter cake. The filtrate contained less than 1 mg/l of zinc and was discarded. The zinc hydroxide filter cake was returned directly into the zinc cyanide plating solution.

The invention has been described with reference to various specific and preferred embodiments and techniques. However, it should be understood that many variations and modifications may be made while remaining within the spirit and scope of the invention.

What is claimed is:

1. A method for treating wastewaters and sludges from a plating process to facilitate reuse of metal values by the recovery of non-ferrous metal hydroxide, said method comprising the following steps (a) through (f) in the order presented:
   (a) lowering the pH of an aqueous slurry obtained from a plating process from an alkaline pH to an acid pH, said slurry comprising solid ferrous hydroxide and a solid non-ferrous metal hydroxide wherein the non-ferrous metal is selected from the group consisting of zinc, nickel, copper (ii) cadmium, and chromium (III) to dissolve the non-ferrous metal hydroxide;
   (b) converting the ferrous hydroxide to solid ferric hydroxide by aeration of the aqueous acidic slurry;
   (c) isolating the solid ferric hydroxide from the slurry leaving a solution comprising non-ferrous metals;
   (d) raising the pH of the solution of step (c) to precipitate non-ferrous metal hydroxide;
   (e) recovering the precipitated non-ferrous metal hydroxide; and
   (f) introducing said non-ferrous metal hydroxide into the plating process.

2. The method of claim 1 wherein the isolated solid ferric hydroxide of step (c) is washed with dilure aqueous acid and the aqueous acid is added to the aqueous slurry of step (a).

3. The method of claim 1 wherein the non-ferrous metal hydroxide comprises a mixture of zinc hydroxide and a second hydroxide of nickle, cooper (II), cadmium or chromium (II); and wherein in step (d) the pH of the slurry is raised to above 12.0 to maintain the zinc hydroxide in solution while precipitating the second metal hydroxide.

4. The method of claim 3 whe the pH of the slurry is raised to about 12-13.5 step (d).

5. The method of claim 4 further comprising lowering the pH of the slurry to precipitate the zinc hydroxide following step (e).

6. The method of claim 5 wherein the pH is lowered to about 7-11 following step (e).

7. The method of claim 1 wherein the non-ferrous metal hydroxide comprises zinc hydroxide.

8. The method of claim 7 wherein the pH is lowered to about 3-7 in step (a).

9. The method of claim 7 wherein the pH is raised to about 7-11 in step (d).

10. The method of claim 1 wherein the non-ferrous metal hydroxide comprises nickel hydroxide.

11. The method of claim 10 wherein the pH is lowered to about 3-7 in step (a).

12. The method of claim 10 wherein the pH is raised to about 8-14 in step (d).

13. The method of claim 1 wherein the non-ferrous metal hydroxide comprises copper (II) hydroxide.

14. The method of claim 13 wherein the pH is lowered to about 3-7.0 in step (a).

15. The method of claim 13 wherein the pH is raised to about 8.0-14.0 in step (d).

16. The method of claim 1 wherein the non-ferrous metal hydroxide comprises cadmium hydroxide.

17. The method of claim 16 wherein the pH is lowered to about 3.0-7.0 in step (a).

18. The method of claim 16 wherein the pH is raised to about 7-14 in step (d).

19. The method of claim 1 wherein the non-ferrous metal hydroxide comprises chromium (III) hydroxide.

20. The method of claim 19 wherein the pH is lowered to about 3-5 in step (a).

21. The method of claim 19 wherein the pH is raised to about 5.75-14 in step (d).

22. A method for treating wastewaters and sludges from a plating process to facilitate reuse of metal values by the recovery of zinc hydroxide, said method comprising the following steps (a) through (f) in the order presented:
   (a) lowering the pH of an aqueous slurry obtained from a plating prodess from an alkaline pH to an acid pH, said slurry comprising solid ferrous hydroxide and solid zinc hydroxide, to dissolve the zonc hydroxide;
   (b) converting the ferrous hydroxide to solid ferric hydroxide by aeration of the aqueous acidic slurry;
   (c) isolating the solid ferric hydroxide from the slurry leaving a solution comprising zinc;
   (d) raising the pH of the solution of step (c) to precipitate zinc hydroxide;
   (e) recovering the precipitated zinc hydroxide; and
   (f) introducing said zonc hydroxide into the plating process.

23. The method of claim 22 wherein the pH of the aqueous slurry in step (a) is about 8-11 prior to lowering.

24. The method of claim 22 wherein the isolated solid ferric hydroxide from step (c) is washed with dilute aqueous acid and the aqueous acid is added to the slurry of step (a).

25. The method of claim 22 further comprising thermally converting the recovered zinc hydroxide to zinc oxide.

26. The method of claim 22 wherein the pH is lowered to about 4-5.5 in step (a).

27. The method of claim 26 in the pH is lowered by combining the slurry with sulfuric acid or hydrochloric acid.

28. The method of claim 26 the pH is raised by combining the slurry with an alkali metal hydroxide.

29. The method of claim 22 wherein the pH is raised to about 8.5-9.5 in step (d).

* * * * *

UNITED STATES PATENT AND TRADEMARK OFFICE
CERTIFICATE OF CORRECTION

PATENT NO. : 4,680,126
DATED : July 14, 1987
INVENTOR(S) : James M. Frankard; Orville V. Broch It is certified that error appears in the above-identified patent and that said Letters Patent is hereby corrected as shown below:

Column 5, line 26, "ro" should be --to--;

Column 9, line 44, "dilure" should be --dilute--;

Column 9, line 49, "cooper" should be --copper--;

Column 9, line 50, "(II)" should be --(III)--;

Column 9, line 54, "whe" should be --wherein--;

Column 9, line 55, insert --in-- before "step";

Column 10, line 36, "zonc" should be --zinc--;

Column 10, line 44, "zonc" should be --zinc--;

Column 10, line 58, "in" should be --wherein--;

Column 10, line 61, after "26" insert --wherein--;

Signed and Sealed this

Twenty-fourth Day of November, 1987

*Attest:*

DONALD J. QUIGG

*Attesting Officer*  *Commissioner of Patents and Trademarks*